(12) United States Patent
Schmidt et al.

(10) Patent No.: US 9,534,297 B2
(45) Date of Patent: Jan. 3, 2017

(54) METALLIC ARTICLES HAVING VITREOUS OR GLASS-CERAMIC PIGMENTED PROTECTIVE LAYERS HAVING A HIGH CHEMICAL RESISTANCE

(75) Inventors: Helmut Schmidt, Saarbruecken-Guedingen (DE); Carsten Schmidt, Saarbruecken (DE); Thomas Dembski, Hombourg-Haut (FR)

(73) Assignee: EPG (ENGINEERED NANOPRODUCTS GERMANY) AG, Griesheim (DE)

( * ) Notice: Subject to any disclaimer, the term of this patent is extended or adjusted under 35 U.S.C. 154(b) by 1000 days.

(21) Appl. No.: 13/140,608

(22) PCT Filed: Dec. 23, 2009

(86) PCT No.: PCT/EP2009/067860
§ 371 (c)(1),
(2), (4) Date: Aug. 9, 2011

(87) PCT Pub. No.: WO2010/072815
PCT Pub. Date: Jul. 1, 2010

(65) Prior Publication Data
US 2011/0293923 A1    Dec. 1, 2011

(30) Foreign Application Priority Data
Dec. 24, 2008  (DE) .................. 10 2008 063 161

(51) Int. Cl.
*B32B 15/04*     (2006.01)
*C23C 18/12*     (2006.01)

(52) U.S. Cl.
CPC ....... *C23C 18/1241* (2013.01); *C23C 18/1208* (2013.01); *Y02T 50/67* (2013.01); *Y10T 428/256* (2015.01); *Y10T 428/257* (2015.01)

(58) Field of Classification Search
None
See application file for complete search history.

(56) References Cited

U.S. PATENT DOCUMENTS

| | | | |
|---|---|---|---|
| 6,162,498 A | | 12/2000 | Mennig et al. |
| 2008/0118745 A1 | | 5/2008 | Endres et al. |
| 2010/0003537 A1 | | 1/2010 | Akarsu et al. |
| 2010/0028631 A1 | | 2/2010 | Mennig et al. |

FOREIGN PATENT DOCUMENTS

| | | | |
|---|---|---|---|
| DE | 102006050102 A1 | | 4/2008 |
| DE | 1022006050102 A1 * | | 4/2008 |
| EP | 1284307 A1 | | 2/2003 |
| WO | WO 2005066388 A2 * | 7/2005 | ............ C23C 18/12 |
| WO | WO 2008099008 A2 * | 8/2008 | |

* cited by examiner

*Primary Examiner* — Kenneth Stachel
(74) *Attorney, Agent, or Firm* — Abel Law Group, LLP

(57) ABSTRACT

Metallic substrates with a vitreous or glass-ceramic pigmented protective layer are obtainable by applying an alkali metal silicate-containing coating sol to the substrate or a surface thereof and thermally densifying the layer thus obtained, said alkali metal silicate-containing coating sol comprising an oxidic pigment of at least one element selected from the third and fourth main or subgroups of the Periodic Table of the chemical elements and the transition metals Fe, Co, Ni, Cu, Zn, Nb and Ta.

19 Claims, No Drawings

METALLIC ARTICLES HAVING VITREOUS OR GLASS-CERAMIC PIGMENTED PROTECTIVE LAYERS HAVING A HIGH CHEMICAL RESISTANCE

BACKGROUND OF THE INVENTION

1. Field of the Invention

The present invention relates to metallic articles having vitreous or glass-ceramic pigmented protective layers exhibiting a high chemical resistance.

2. Discussion of Background Information

Vitreous or glass-ceramic protective layers are applied to metallic surfaces generally by what is called an enameling operation. Enamels are glasses which melt relatively readily at relatively high temperatures and then form a coherent coating on the metal surface. The melting temperatures are generally between 750 and 800° C. when enamels with a sufficient chemical resistance are to be achieved, for example toward boiling water, weak acids or alkaline, boiling or cooking foods, etc. The latter is required particularly in applications in the foods sector.

The enamels are applied in a wet process, wherein an aqueous slurry or suspension (engobe) of the finely ground glass powder (frit) is generally applied to the metal surface (for example by dipping or spray application), dried and then melted at the abovementioned temperatures. To achieve a coherent, impervious, pore-free coating, layer thicknesses of 50 to 100 µm are required. Owing to the high viscosity of glasses and the high softening temperatures which exist particularly in the case of silicate glasses, as already mentioned, melting temperatures of well above 700° C. are required. The softening temperature depends to a particularly high degree on the silica content of the glass. High silica contents lead to a high softening temperature and result in a high chemical resistance of the glass. High alkali metal contents, in contrast, result in a low softening temperature but lead to a low chemical resistance (low hydrolytic class). Especially for the use of such layers in the field of aggressive media (for example acidic) or in the foods sector, especially when, for example, machine dishwasher stability is required, the low-melting layers mentioned are therefore unsuitable. This is also one of the reasons why, for example, enamel is not used on aluminum in the domestic appliance sector, especially in cookware, because aluminum already melts at temperatures a little above 600° C. The situation is analogous in the case of magnesium or in the case of magnesium-aluminum alloys. The same also applies to metal assemblies composed of several components when one of these components is from the range of the abovementioned lightweight metals.

Furthermore, coloring is of crucial importance for many applications since the question of an attractive design is of high significance for many articles, particularly in the consumer goods sector. In the foods sector, the question of food compatibility and of toxicology in particular is a predominant factor. For this reason, the chemical resistance of a vitreous coating is of particular significance especially when it is necessary to prevent leaching of components, for example metal ions, out of coloring pigments.

It was therefore an object of the invention to provide metallic substrates with a colored vitreous coating having improved chemical properties, especially improved alkali stability extending as far as machine dishwasher stability.

Important prerequisites for the achievement of corrosion-resistant layers are a high stability of the matrix material of the coating, especially toward alkalis, crack- and pinhole-free consolidation, for which an appropriately matched coefficient of expansion of the coating material to the substrate is also required. However, it is known that, in the case of pigmented systems in which shrinkage of the coating matrix is unavoidable, nonshrinking pigments, for example oxidic pigments, lead to stresses and cracking in the course of sintering. It is known from the relevant glass literature that the alkali stability of silicate glasses can be improved significantly by addition of particular ions (network-stabilizing components). Possible solutions to the problem are therefore glass compositions which comprise such components (for example aluminum oxide or titanium dioxide). As likewise known from the sol-gel literature, sol-gel coatings with such multicomponent systems are difficult to produce, have exceptionally short pot life, are generally stable only in strongly acidic solutions and are therefore barely practicable in industry. If such systems are to be produced with high coefficients of expansion in order to be matched to the coefficients of expansion of metals (TCE$\approx$8×10$^{-6}$/K or greater), the alkali metal contents must be increased well above the level of conventional glasses (10 to 15 percent by weight), which is in turn associated with a severe loss of chemical stability.

Patent specifications U.S. Pat. No. 6,162,498 and US 2008/0118745 describe processes in which vitreous, relatively abrasion-resistant layers resistant to oxidation corrosion (for example tarnishing of stainless steel) are obtained. The process comprises the production of a coating solution via hydrolysis and polycondensation of one or more silanes in the presence of colloidal silica sol and of at least one component from the group of the alkali metal and alkaline earth metal oxides and hydroxides;

the application of the coating solution to a metal surface to form a layer;

thermal densification to form a vitreous film;

in U.S. Pat. No. 6,162,498, the use of densification temperatures between 350 and 500° C.;

in US 2008/0118745, additionally the formation of formable vitreous layers, via the use of an alkali metal silicate-containing layer through densification in a two-stage operation with a preferred temperature of 500° C.;

the production of layer systems via dipping and spraying with layers in the range from 5 to 10 µm;

the application of the coatings to metal surfaces and metal components, especially to stainless steel, but also to aluminum and aluminum alloys.

The systems described have a high $SiO_2$ content and are therefore stable only to acids, and not in an alkaline medium. Thus, these layers can be removed quantitatively even with relatively dilute hot sodium hydroxide solution and are not machine dishwasher-stable in any case, which means that they are not normally suitable for the foods sector or as protective layers for applications at relatively high pH values.

However, these layers are also suitable for application to aluminum and aluminum alloys since the densification temperatures thereof are well below 600° C.; however, this does not improve chemical stability with regard to alkali resistance. The layers are also suitable for coating of components and assemblies composed of aluminum or aluminum alloys and other metals, whether in the form of a laminate formed from metal sheets or plates, in the form of a sandwich, or assemblies comprising components made from different metals which are bonded or joined to one another in some other way (for example screwed, pressed or riveted).

It has now been found that, surprisingly, the disadvantages outlined above, especially the insufficient chemical stability of such coating materials, are alleviated or avoided when they are used in conjunction with pigments, preferably platelet-shaped pigments, but especially when they are applied as a multiple layer. They then have a distinct increase in hydrolytic stability and, in the machine dishwasher test, withstand several hundred cycles without impairment.

In addition, it was also surprising that the pigmented coating solutions achieve layers which sinter to produce impervious layers, even though sintering operations in which thermal densification of the matrix material inevitably leads to shrinkage, with oxidic additives (i.e. already imperviously sintered additives which by their nature cannot shrink any further), generally cause internal crack formation. The latter worsens the chemical stability in particular to an exceptional degree since corrosive liquids penetrate into the layer through the cracks and cause corrosion processes at the metal surface resulting in detachment phenomena. In addition, it was also surprising that the layer systems for which an estimate of the coefficients of expansion of the matrix gave values between $\alpha=1.0$ and $4.0\times10^{-6}$/K due to their composition, in spite of differences between the coated metals ($\alpha>10$), did not give rise to any deterioration in the imperviosity of the layer. Coating solutions with compositions corresponding to customary soda-lime glasses with corresponding thermal properties were produced in the context of the invention, but are not preferred due to the problems described above. Moreover, the coefficients of expansion which are measured in solid glass are only of minor relevance for thin layers since structures which arise in thin layers differ significantly from the structure of solid glass and hence also have different properties.

SUMMARY OF THE INVENTION

The present invention provides a metallic substrate with a vitreous or glass-ceramic pigmented protective layer. The substrate is obtainable by applying an alkali metal silicate-containing coating sol to the substrate or a surface thereof and thermally densifying the layer thus obtained. The alkali metal silicate-containing coating sol comprises at least one oxidic pigment that comprises at least one element selected from the third and fourth main and subgroups of the Periodic Table of Elements (such as, e.g., one or more of B, Al, Si, Ge, Sn, Y, Ce, Ti, and Zr), Fe, Co, Ni, Cu, Zn, Nb, and Ta.

In one aspect of the metallic substrate, the at least one oxidic pigment may be platelet-shaped.

In another aspect, the alkali metal silicate-containing coating sol may be obtainable by a process that comprises hydrolysis and polycondensation of one or more silanes of general formula (I):

$$R_nSiX_{4-n} \quad (I)$$

in which the groups X are the same or different and represent a hydrolyzable group or a hydroxyl group, the groups R are the same or different and represent hydrogen, alkyl, alkenyl, and alkynyl groups having up to 4 carbon atoms, and aryl, aralkyl and alkaryl groups having from 6 to 10 carbon atoms, and n is 0, 1 or 2, with the proviso that in at least one silane of formula (I) n=1 or 2, or oligomers derived therefrom, in the presence of a) at least one compound selected from the oxides and hydroxides of the alkali and alkaline earth metals, and b) optionally, nanoscale $SiO_2$ particles and/or c) optionally, alkoxides and/or soluble compounds of at least one of B, Al, Si, Ge, Sn, Y, Ce, Ti, and Zr.

In one aspect of the above process, the alkali and/or alkaline earth element(s) may be employed in an amount to afford an atomic ratio Si:alkali/alkaline earth metal of from 20:1 to 7:1, e.g., from 15:1 to 10:1.

In another aspect of the above process, the average value of n in the starting silanes of formula (I) may be from 0.2 to 1.5, e.g., from 0.5 to 1.0.

In another aspect of the metallic substrate of the present invention, the coating sol may comprise from 0.5% to 30% by weight, e.g., from 5% to 25% by weight, or from 10% to 20% by weight of the at least one oxidic pigment.

In yet another aspect, the obtained layer may be thermally densified at a temperature of from 350° C. to 600° C., e.g., at a temperature of from 450° C. to 500° C., optionally preceded by a drying operation.

In a still further aspect, the thermal densification of the obtained layer may be preceded or followed by an overcoating with the alkali metal silicate-containing coating sol that is free of pigment to obtain a layer which is thermally densified together with or after the pigmented layer. For example, the alkali metal component of the pigment-free alkali metal silicate-containing coating sol may be selected from the combinations Na/K, Na/Cs, and Na/Li.

The present invention also provides a process for producing the metallic substrate of the present invention as set forth above (including the various aspects thereof). The process comprises applying an alkali metal silicate-containing coating sol to the substrate or a surface thereof and thermally densifying the layer thus obtained. The alkali metal silicate-containing coating sol comprises at least one oxidic pigment that comprises at least one element selected from the third and fourth main and subgroups of the Periodic Table of Elements, Fe, Co, Ni, Cu, Zn, Nb, and Ta.

In one aspect of the process, the thermal densification may be performed in two stages, a first stage conducted in an oxygen containing atmosphere and a second stage conducted in a low-oxygen atmosphere until complete densification to form a vitreous layer.

The present invention also provides a method of improving the stability of a metallic substrate toward alkali and/or its machine dishwasher stability. The method comprises providing the metallic substrate or a surface thereof with a layer of a thermally densified alkali metal silicate-containing coating sol that comprises at least one oxidic pigment comprising at least one element selected from the third and fourth main and subgroups of the Periodic Table of Elements, Fe, Co, Ni, Cu, Zn, Nb, and Ta.

DETAILED DESCRIPTION OF THE INVENTION

The present invention provides a process for producing metal articles with low-sintering, thin, vitreous or glass-ceramic pigmented protective layers with high chemical stability, which is particularly suitable for metallic assemblies and components which consist of low-melting metals, for example aluminum, magnesium or alloys thereof, or of assemblies of these metals in conjunction with high-melting metals such as stainless steel.

Suitable metallic surfaces to be coated in accordance with the invention include all surfaces which consist of or comprise a metal or metal alloy on semifinished and finished products. Examples of metal surfaces include those composed of aluminum, aluminum alloys, tin, copper, chromium or nickel, including zinc-plated, chromium-plated or enameled surfaces. Examples of metal alloys are especially steel or stainless steel, aluminum alloys, magnesium alloys and copper alloys, such as brass and bronze. Preference is given to using metallic surfaces composed of aluminum and aluminum alloys, steel, stainless steel, and zinc-plated or chromium-plated steel. Particular preference is given to what are called sandwich structures, which, for reasons of improved heat conduction or heat distribution, comprise cores of aluminum or aluminum alloys which, however, for the purpose of a mechanically stressable surface or for decorative reasons, have upper and lower stainless steel sides. This three-material composite has been found to be particularly useful for the cookery sector, for example for grill pans and other cookery equipment and vessels.

Preferably, the metallic surface is cleaned thoroughly before the application of the coating composition, and especially freed of grease and dust. Before the coating, a surface treatment, for example by corona discharge, can also be performed.

The metallic surface or the metallic substrate may have a flat or structured surface. The metallic surface preferably has a structured surface. It may be a microstructured surface or a structure of greater dimensions. The structure may be regular, as obtained, for example, by embossing, or irregular, as obtained, for example, by roughening, for which brushing or sandblasting is one of the most common methods.

The invention further provides a metallic substrate with a deformable vitreous coating, obtainable by applying a pigment-containing alkali metal silicate-containing coating sol which has been dispersed without agglomerates to the substrate and thermally densifying the layer thus obtained, a particularly preferred embodiment involving overcoating of the pigmented layer which has either been thermally densified or dried at temperatures up to 120° C. with a nonpigmented layer having the same composition as the matrix composition of the pigmented base layer, and subsequent heat treatment of the layer(s). According to the pigment type, densification is effected in a multistage heat treatment process, the heat treatment in the first stage being performed either (A) in an oxygenous atmosphere or (B) under reduced pressure at a residual pressure of, for example, ≤15 mbar, and in the second stage in a low-oxygen atmosphere until complete densification to form a vitreous layer. To accelerate the densification process, it is optionally also possible to additionally add steam in different concentrations to the oven atmosphere.

The coating process comprises the following steps:
a) Production of a composite coating solution by the hydrolysis and condensation of one or more organoalkoxysilanes, of an orthosilicic ester, in the presence of a soluble oxide, hydroxide or soluble and thermally readily decomposable compound of an alkali metal, especially lithium, sodium, potassium or cesium, and optionally in the presence of colloidal silica sol and of an alkoxide of an element from the third or fourth main or subgroups of the Periodic Table of the chemical elements, for example of the elements B, Al, Ge, Sn, Ti, Zr, and further elements such as P or Nb.
b) Dispersion of platelet-shaped or other pigments, which preferably comprise oxides of elements from the third and fourth main or subgroups, especially the oxides of the elements B, Al, Si, Ge, Sn, Y, Ce, Ti or Zr, or of the transition metals Fe, Co, Ni, Cu, Zn, Nb or Ta. These pigments are optionally provided with an appropriate surface modification beforehand to improve the dispersibility, because the freedom of the dispersion from agglomerates facilitates the achievement of a high chemical stability. It is also possible to use mixtures or compounds of these oxides (for example spinels such as FeAl spinel) or oxide particles coated with interference layers, preferably consisting of $SiO_2$ or $Al_2O_3$, or oxidic platelet-shaped particles which may also include other oxidic compositions, for example mica platelets. Such pigments, which are also commercially available by the name of effect or interference pigments, are, for example, coated with oxidic interfering layers of $TiO_2$, $Al_2O_3$, $ZrO_2$ or $Fe_2O_3$, and enable, through their interference effect, a broad spectrum of different colors and, in dispersed form, what is called the metallic effect. These oxides should of course be considered merely to be illustrative, and it is of course also possible to use other pigments. The particle sizes in which these pigments are used are unimportant. Patent specification WO 2008/099008 describes a process in which wet grinding of such pigments with a starting size of approximately 25 μm gives pigments in the order of magnitude of 5 μm, which lead to particularly smooth layers. For the production of machine dishwasher-resistant or alkali-resistant colored layers according to the present invention, however, the shape and size of the particles are not crucial provided that they do not exceed the micrometer range.
c) Application of the coating suspension to the metal substrate, preferably with a wet film thickness of 5 to 20 μm, more preferably 8 to 11 μm, preferably by means of a spraying operation.
d) Drying of the wet film to dust-dryness.
e) Baking of the coating at temperatures of 350 to 600° C., preferably 450 to 500° C., under a suitable atmosphere, for example in a reducing atmosphere in the case of use of carbon black as a pigment, or in an oxidizing atmosphere in the case of use of coloring iron(III) compounds, the color of which depends on the maintenance of iron(III) during the baking operation.
f) Overcoating of the cooled substrate with a composition according to a), except that the alkali metal component used is a combination of two components from the group of Na/K, Na/Cs or Na/Li. Particular preference is given here to the combination of Na/K.
g) Baking of the overcoat at temperatures of 350 to 600° C., preference being given to the range from 450 to 500° C. Preferred layer thicknesses are 3 to 8 μm, more preferably 4 to 6 μm.
h) Alternatively to e), the overcoating according to f) may follow the drying of the coating according to c). The baking operation is effected according to e) or g).

While the coating system according to a) without the pigments described as additives does not have sufficient alkali stability for use in a machine dishwasher, the same layer compositions in pigmented form or as an overcoat exhibit a high machine dishwasher stability. Without wishing to be bound to a particular theory, this could be explained by the fact that the alkali stability of vitreous silicatic systems can be improved significantly by the incorporation of particular network-stabilizing ions into the glass structure. These include ions of the above-listed elements of the third and fourth main and subgroups, and the transition metals of the iron group. The network-stabilizing effect can be explained by the diffusion of such ions from the pigment/additive surface into the micro- or nanopore structure of the coating material according to a) before the structure has been thermally densified.

To develop the effect, very substantially agglomerate-free dispersion of the pigments is required, since a sufficient contact area between the matrix system according to a) and the stabilizing pigments is possible only through such a homogenization. For the dispersion, therefore, depending on the physicochemical surface properties of the pigments, a surface modification is required to minimize the interaction between the individual pigment particles. For this reason, the layer thickness of the second layer is also preferably kept to a minimum in order to achieve very short diffusion pathways.

It was an important object of this invention to develop a coating system with which consumer goods, assemblies, reactors, components for vehicles, kitchen appliances, cookware, cutlery, accessories, electrical equipment and many other substrates can be coated, in the case of which not only a high level of decorative effect but also a sufficient chemical stability is required, and in the case of which the sole use of metals with a low melting point or, in the case of use of these metals in combination with higher-melting metals (such as copper, steel, stainless steel, brass), the use of commercial enamels was impossible. A special case for the requirement of chemical stability is the above-described machine dishwasher stability. Examples of further requirements are stability to hand perspiration, to acids and alkalis, to the different components in foods (organic acids, complexing agents, proteins, surfactants, etc.) or to salt stress (for example in the automotive sector).

Such a coating composition is obtainable, for example, by hydrolysis and polycondensation of one or more silanes of the general formula

$$R_n SiX_{4-n} \quad (I)$$

in which the X groups are the same or different and are each hydrolyzable groups or hydroxyl groups, the R radicals are the same or different and are each hydrogen, alkyl, alkenyl, and alkynyl groups having up to 4 carbon atoms, and aryl, aralkyl and alkaryl groups having 6 to 10 carbon atoms, and n is 0, 1 or 2, with the proviso that at least one silane where n=1 or 2 is used, or oligomers derived therefrom, in the presence of a) at least one compound from the group of the oxides and hydroxides of the alkali metals and alkaline earth metals and b) optionally added nanoscale $SiO_2$ particles, c) optionally alkoxides or soluble compounds of the metals B, Al, Si, Ge, Sn, Y, Ce, Ti or Zr, d) color or whitening pigments for the coloring base layer, which are in agglomerate-free dispersion.

It is thus possible to obtain vitreous colored or white layers on metallic surfaces, the thickness of which may, for example, be up to 10 µm, without any occurrence of cracking in the course of drying and in the course of densification. The coating compositions applied can be converted to impervious silicatic vitreous films, for example, on stainless steel or steel surfaces even at relatively low temperatures (generally from 400° C.). The layers produced in accordance with the invention generally have a thickness of 2 to 8 µm, preferably 2.5 to 7 µm and especially 3 to 6 µm. They form a hermetically sealing layer which, even at relatively high temperatures, prevents ingress of oxygen to the metallic surface. In a particularly preferred embodiment, a second pigment-free coating of the same composition is applied to the coloring base layer, in which case the application, as appropriate, follows drying of the coloring base layer at temperatures up to 120° C., preferably 100° C. and in a particularly preferred embodiment at 80° C. The top layers produced in accordance with the invention generally have a layer thickness of 1 to 7 µm, preferably 2 to 6 µm and especially 3 to 5 µm. They are alkali-resistant, weathering-resistant, hand perspiration-resistant and machine dishwasher-resistant.

The invention is especially suitable for the production of vitreous surface layers of metallic assemblies for built structures and parts thereof, for example facing panels composed of steel, stainless steel, aluminum and aluminum alloys; means of locomotion and transportation and parts thereof; equipment, devices and machines for commercial or industrial purposes and research, and parts thereof; household items and equipment for the household and parts thereof; electrical and cooking equipment, cookware, vessels, cutlery and parts thereof, equipment and aids for games, sport and leisure, and parts thereof, and equipment, aids and devices for medical purposes and invalids.

The coatings are additionally suitable in an analogous manner for application to ceramic or glass surfaces. Specific examples of such coatable materials or items as a substrate are specified hereinafter. The coated surfaces are preferably surfaces of steel or stainless steel.

Built Structures (Especially Buildings) and Parts Thereof:

Internal and external facings of buildings, floors and stairways, escalators, lifts, for example the walls thereof, banisters, furniture, paneling, fittings, doors, handles (especially with anti-fingerprint finishes, for example door handles), sheet metal for facings, floor coverings, windows (especially window frames, window sills and window handles), blinds, fittings in the kitchen, bathroom and toilet, shower cubicles, sanitary cubicles, toilet cubicles, generally objects in the sanitary sector (for example toilets, wash basins, fittings, accessories), pipes (and especially drainpipes), radiators, light switches, lamps, lighting, letterboxes, cash dispensers, information terminals, seawater-resistant coatings for the finishing of harbor constructions, eaves, gutters, aerials, satellite dishes, handrails on banisters and escalators, ovens, wind turbines, especially rotor blades, monuments, sculptures, and generally works of art with metallic surfaces, especially those which are exhibited outdoors.

Household Items and Equipment for the Household and Parts Thereof:

Trash cans, dishware and cookware (for example of stainless steel, aluminum, aluminum alloys and sandwich metals, especially in three layers with a core of aluminum or aluminum alloys and with other metals on the outside, for example stainless steel), cutlery (for example knives), trays, pans, pots, baking tins, cooking utensils (for example graters, garlic presses and holders), hanging devices, refrigerators, cooking area frames, cooking hobs, hotplates, heated surfaces, baking ovens (internal and external), egg boilers, microwave units, kettles, grill grids, steamers, ovens, working surfaces, fittings in the kitchen sector, vapor extractor hoods, flower vases, casings of TV equipment and stereo units, casings of (electrical) household equipment, flower vases, Christmas tree baubles, furniture, furniture fronts made of stainless steel, sinks, lamps and lighting.

Modes of locomotion and transport (for example passenger vehicle, heavy goods vehicle, omnibus, motorbike, moped, bicycle, railway, tramway, ship and airplane) and parts thereof:

Mudguards for bicycles and motorbikes, instruments on motorbikes, door handles, steering wheels, tire rims, exhaust systems and pipes, thermally stressed parts (engine parts, linings, valves and valve linings), fittings, latent heat exchangers, coolers, parts of the interior trim with a metallic surface (for example as a scratch-resistant coating), fuel nozzles, luggage carriers, roof containers for passenger vehicles, display instruments, tankers, for example for milk, oil or acid, and generally all chassis parts, and seawater-resistant coating for the finishing of ships and boats.

Equipment, devices and machines (for example from plant construction (chemical industry, foods industry, power plants) and energy technology) for commercial or industrial purposes and research, and parts thereof:

Heat exchangers, compressor wheels, gap helical exchangers, copper elements for industrial heating, molds (for example casting molds, especially of metal), rubble chutes, filling plants, extruders, waterwheels, rollers, conveyor belts, printing presses, screenprinting templates, dispensing machines, (machine) casings, drill heads, turbines, pipes (internal and external, especially for liquid and gas transport), stirrers, stirred tanks, ultrasound baths, cleaning baths, containers, transport devices in ovens, internal lining of ovens for high-temperature, oxidation, corrosion and acid protection, gas bottles, pumps, reactors, bioreactors, tanks (for example fuel tanks), heat exchangers (for example in food processing technology or for (biomass) solid fuel tanks), waste air units, saw blades, covers (for example for balances), keyboards, switches, knobs, ball bearings, shafts, screws, solar cells, solar units, tools, tool handles, liquid containers, insulators, capillaries, laboratory equipment (for example chromatography columns and fume hoods) and parts of electrical accumulators and batteries.

Aids for Games, Sport and Leisure:

Garden furniture, garden equipment, tools, playground equipment (for example slides), snowboards, scooters, golf clubs, dumbbells, weights, training equipment, fittings, seats in parks, playgrounds, fixtures and equipment in swimming pools, etc.

Equipment, Aids and Devices for Medical Purposes and Invalids:

Surgical instruments, cannulas, medical containers, dental equipment, spectacle frames, medical tools (for operations and dental treatment), generally items from the sector of medical technology (for example pipes, apparatus, containers) and wheelchairs, and also quite generally hospital equipment.

In addition to the above items, it is of course also possible to provide other items and parts thereof advantageously with the above surface layers, for example toys, jewelry, coins.

The coating composition and the components thereof will be described hereinafter.

Among the above silanes of the general formula (I) is at least one silane in whose general formula n has the value of 1 or 2. In general, at least two silanes of the general formula (I) are used in combination. In this case, these silanes are preferably used in such a ratio that the average value of n (on a molar basis) is 0.2 to 1.5, preferably 0.5 to 1.0. Particular preference is given to an average value of n in the range from 0.6 to 0.8.

In the general formula (I), the X groups, which are the same or different from one another, are hydrolyzable groups or hydroxyl groups. Specific examples of hydrolyzable X groups are halogen atoms (especially chlorine and bromine), alkoxy groups and acyloxy groups having up to 6 carbon atoms. Particular preference is given to alkoxy groups, especially $C_{1-4}$-alkoxy groups such as methoxy, ethoxy, n-propoxy and i-propoxy. The X groups in one silane are preferably identical, particular preference being given to using methoxy or ethoxy groups.

The R groups in the general formula (I), which may be the same or identical in the case that n=2, are hydrogen, alkyl, alkenyl and alkynyl groups having up to 4 carbon atoms and aryl, aralkyl and alkaryl groups having from 6 to 10 carbon atoms. Specific examples of such groups are methyl, ethyl, n-propyl, i-propyl, n-butyl, sec-butyl and tert-butyl, vinyl, allyl and propargyl, phenyl, tolyl and benzyl. The groups may have customary substituents, but such groups preferably do not bear any substituents. Preferred R groups are alkyl groups having from 1 to 4 carbon atoms, especially methyl and ethyl, and also phenyl.

It is preferred in accordance with the invention when at least two silanes of the general formula (I) are used, where n=0 in one case and n=1 in the other case. Such silane mixtures include, for example, at least one alkyltrialkoxysilane (e.g. (m)ethyltri(m)-ethoxysilane) and one tetraalkoxysilane (e.g. tetra(m)ethoxysilane), which are preferably used in such a ratio that the average value of n is within the above-specified preferred ranges. A particularly preferred combination for the starting silanes of the formula (I) is methyltri(m)ethoxysilane and tetra(m)ethoxysilane, which are preferably used in such a ratio that the average value of n is within the above-specified preferred ranges.

The hydrolysis and polycondensation of the silane(s) of the general formula (I) is conducted in the presence of at least one compound from the group of the alkoxides, oxides, hydroxides and soluble compounds thermally decomposable up to 400° C. of the alkali metals and alkaline earth metals. These compounds are preferably those of Li, Na, K, Cs, Mg, Ca and/or Ba. Preference is given to using alkali metals, especially Na and/or K. When an alkali metal compound is used without optionally used alkaline earth metal oxides or network-stabilizing oxides such as B, Al, Si, Ge, Sn, Y, Ce, Ti or Zr or of the transition metals Fe, Co, Ni, Cu, Zn, Nb or Ta, or of Ca, it is preferably used in such an amount that the Si:alkali metal atomic ratio is in the range from 20:1 to 7:1, especially from 15:1 to 10:1. In each case, the atomic ratio of silicon to alkali metal/alkaline earth metal is selected at a sufficiently high level that the resulting coating is not water-soluble. If, in contrast, alkaline earth metal oxides or the abovementioned network-stabilizing elements are used in addition, the molar ratio of alkali metal:silicon can be increased up to a value of 2:1 (corresponding to alkali metal contents of up to 12 percent by weight).

Any nanoscale $SiO_2$ particles used in addition to the hydrolyzable silanes of the general formula (I) are preferably used in such an amount that the ratio of all silicon atoms in the silanes of the general formula (I) to all silicon atoms in the nanoscale $SiO_2$ particles is in the range from 5:1 to 1:2, in particular from 3:1 to 1:1.

Nanoscale $SiO_2$ particles are understood to mean $SiO_2$ particles having an average particle size (or an average particle diameter) of preferably not more than 100 nm, more preferably not more than 50 nm and especially not more than 30 nm. For this purpose, it is also possible, for example, to use commercial silica products, for example silica sols such as the Levasils®, silica sols from Bayer AG, or fumed silicas, for example the Aerosil products from Degussa, Ludox® from DuPont. It is likewise possible to use silica sols in alcoholic solvents, as supplied, for example, by Nishin Chemicals. The particulate materials can be added in the form of powders and sols. However, they can also be formed in situ in the course of hydrolysis and polycondensation of the silanes.

The hydrolysis and polycondensation of the silanes can be conducted in the absence or presence of an organic solvent. Preferably, no organic solvent is present. When an organic solvent is used, the starting components are preferably soluble in the reaction medium (which generally includes water). Suitable organic solvents are especially water-miscible solvents, for example mono- or polyhydric aliphatic alcohols (for example methanol, ethanol), ethers (for example diethers), esters (for example ethyl acetate), ketones, amides, sulfoxides and sulfones. Otherwise, the hydrolysis and polycondensation can be conducted according to the modalities familiar to those skilled in the art.

Any added compounds of B, Al, Si, Ge, Sn, Y, Ce, Ti or Zr or of the transition metals Fe, Co, Ni, Cu, Zn, Nb or Ta, or Ca, which react thermally to give oxidic components, can be used in the form of soluble alkoxides or soluble compounds which decompose at temperatures up to 400° C., for example salts of organic acids. Examples thereof are acetates, formates, propionates or oxalates, but also all other organic acids which are soluble in the reaction medium. Additionally useful are the examples of readily decomposable nitrates which are known from the literature.

Useful oxidic pigments include commercial color pigments, for example spinels, especially aluminum spinels, oxides of transition metals such as iron, cobalt or nickel, but also mixtures of the same. In addition, it is also possible to use carbon blacks to deepen the color.

Useful effect pigments include what are called interference pigments with oxidic composition. These include all commercial effect pigments, for example the Iriodin pigments from Merck.

To produce an agglomerate-free dispersion, commercial surface modifiers, for example functional silanes or chelate-forming complexing agents with suitable functional groups, are optionally used. Examples of silanes are the epoxy silanes for production of hydrophilic surfaces, or alkylalkoxysilanes for production of hydrophobic surfaces. Examples of chelate-forming complexing agents are, for example, β-diketones.

The pigmented coating solution is produced by hydrolysis of the starting compounds for the oxidic components in the presence of alkali metal compounds and of the pigments in agglomerate-free dispersion.

The coating composition used in accordance with the invention may comprise additives customary in the coatings industry, for example additives which control rheology and drying characteristics, wetting and leveling aids, antifoams, solvents, dyes and pigments. Suitable solvents are, for example, alcohols and/or glycols, for example a mixture of ethanol, isopropanol and butylglycol. It is also possible to add commercial matting agents, for example microscale $SiO_2$ or ceramic powders, in order to achieve matt layers with anti-fingerprint properties. If they are used, the silanes can be hydrolyzed and polycondensed in the presence of matting agents, for example microscale $SiO_2$ or ceramic powders. However, they can also be added to the coating composition at a later stage.

The pigmented coating composition used in accordance with the invention can be applied to the metallic surface by customary coating methods. Usable techniques are, for example, dipping, casting, flow-coating, spin-coating, spraying, spreading or screenprinting. Particular preference is given to automated coating processes such as flat spraying, use of spray robots and automatic spraying with machine-guided rotating or swiveling substrates. For dilution, customary solvents can be used, as are commonly used in the coatings industry.

The coating composition applied to the metallic surface is normally dried at room temperature or slightly elevated temperature (for example a temperature of up to 100° C., especially up to 80° C., before it is densified thermally to a vitreous layer. The thermal densification can optionally also be effected by IR or laser radiation.

In a second step, in a preferred embodiment of the present invention, at least one further (vitreous) layer, which generally has the same base composition as the pigmented layer except that this layer is produced without pigments, can be applied to the (pigmented) layer thus produced. Such a vitreous layer can be provided on the vitreous pigmented layer produced in accordance with the invention by providing the coating provided on the metallic surface in accordance with the invention, before the thermal densification thereof (and preferably after the drying thereof at room temperature or elevated temperature), with the coating composition for the vitreous layer, and then thermally densifying the two coatings together.

According to the invention, the metallic surfaces receive a weathering-resistant, corrosion-inhibiting, scratch-resistant, alkali-resistant and machine dishwasher-resistant coating which especially also helps to prevent soiling, for example by fingerprints, water, oil, grease, surfactants and dust.

The examples which follow illustrate the invention without restricting it.

Example 1

Production of the NaKSi-B Matrix System 750 ml of methyltriethoxysilane, 210 ml of tetraethoxysilane, 12 g of NaOH and 16.8 g of KOH are added to a closable glass vessel with a stirrer and stirred vigorously. After two to three hours, the NaOH and KOH have dissolved completely. Stirring is continued until a total time of 15 hours is attained. Then, while stirring vigorously, 96 ml of water distilled over a period of two hours are added dropwise. During this time, the temperature is increased to 40° C. Subsequently, the reaction mixture, while continuing to stir, is cooled to room temperature over a period of one hour.

The NaKSi-B matrix system can be stored in a freezer at −15° C. over several months.

Example 2

Production of a Coating Solution Comprising Red Interference Pigments 5 g of the red interference pigment Lava Red® from Merck AG are dispersed in 100 g of the NaKSi-B matrix system while stirring vigorously in the presence of 10 g of butylglycol as a compatibilizer/surface modifier and leveling agent. This achieves an agglomerate-free dispersion having a viscosity of approximately 15 mPa·s, which is suitable for use in an automatic spray coating technology.

Example 3

Production of a Coating Solution Comprising Red Interference Pigments 5 g of the red interference pigment Lava Red® from Merck AG are dispersed in 100 g of the NaKSi-B matrix system while stirring vigorously in the presence of 10 g of butylglycol in which 2 g of γ-aminopropyl-triethoxysilane are present as a compatibilizer/surface modifier and leveling agent in addition to butylglycol. This achieves an agglomerate-free dispersion having a viscosity of approximately 15 mPa·s, which is suitable for use in an automatic spray coating technology.

Example 4

Production of a Whitening Coating Solution 66.66 g of the NaKSi-B matrix system are mixed with 33.33 g of isopropanol as a compatibilizer in a closable vessel with stirrer, and 10 g of $TiO_2$ (Tronox® CR-826) are added while stirring vigorously, and stirring is continued for about one hour. Subsequently, while continuing to stir, 0.33 g of aluminum oxide platelets of the "Alusion" type is dispersed, and stirring is continued for five hours. The suspension is stored in a closed vessel, can be stored when cooled to −15° C. over several weeks without any change in its properties.

Example 5

Production of Metal Substrates Coated with Red Interference Pigment

Pigmented Lava Red® coating solutions produced according to one of Examples 2 and 3 are introduced into the reservoir vessel of a spray gun or of a spray robot, and sprayed onto the item to be coated according to industrial standard test methods with compressed air as the propellant. The appropriate computer program for the robot control is compiled as a function of the geometry of the substrate. The robot control is designed to achieve a wet film thickness of 10 μm.

The coated substrate is dried under air and then the matrix system according to Example 1 is applied so as to achieve a wet film thickness of approximately 6 μm.

The two-layer system is densified with ingress of oxygen, for example from the ambient air, in an industrial kiln at 500° C. over a period of 6 hours.

Example 6

Production of Metal Substrates Coated with Red Interference Pigment

Pigmented Lava Red® coating solutions produced according to one of Examples 2 and 3 are introduced into the reservoir vessel of a spray gun or of a spray robot, and sprayed onto the item to be coated according to industrial standard test methods with compressed air as the propellant. The appropriate computer program for the robot control is compiled as a function of the geometry of the substrate. The robot control is designed to achieve a wet film thickness of 10 μm.

The coated substrate is densified with ingress of oxygen, for example from the ambient air, in an industrial kiln at 500° C. over a period of 6 hours. Subsequently, the matrix system according to Example 1 is applied, such that a wet film thickness of approximately 6 μm is attained.

The two-layer system is subsequently fired in an industrial kiln at 500° C. over a period of six hours.

Example 7

Production of White-coated Sandwich Metal Substrates $TiO_2$-pigmented coating solutions produced by the process from Example 4 are introduced into the reservoir vessel of a spray gun or of a spray robot, and sprayed in accordance with industrial standard test methods with compressed air as the propellant onto the sandwich component to be coated, which consists of a core of Al and of a stainless steel layer above and below. The appropriate computer program for the robot control is compiled as a function of the geometry of the substrate. The robot control is designed to achieve a wet film thickness of 11 μm.

The coated substrate is densified with ingress of oxygen, for example from the ambient air, in an industrial kiln at 500° C. over a period of 11 hours. Subsequently, the matrix system according to Example 1 is applied so as to attain a wet film thickness of approximately 6 μm.

The two-layer system is subsequently fired in an industrial kiln at 500° C. over a period of 6 hours.

What is claimed is:

1. A metallic substrate with a vitreous or glass-ceramic pigmented protective layer, wherein the substrate is obtainable by applying a first alkali metal silicate-containing coating sol to the substrate or a surface thereof to form a first layer and either
   (i) thermally densifying the first layer, applying a second alkali metal silicate-containing coating sol to the densified first layer to form a second layer, and thermally densifying the second layer, or
   (ii) applying a second alkali metal silicate-containing coating sol to the first layer to form a second layer and thermally densifying the first layer and the second layer together, the first alkali metal silicate-containing coating sol comprising at least one oxidic pigment that comprises at least one element selected from Fe, Co, Ni, Cu, Zn, Nb, Ta, and elements from the third and fourth main and subgroups of the Periodic Table of Elements, and the second alkali metal silicate-containing coating sol differing from the first alkali metal silicate-containing coating sol in that it does not comprise the at least one oxidic pigment.

2. The metallic substrate of claim 1, wherein the at least one element comprises at least one of B, Al, Si, Ge, Sn, Y, Ce, Ti, and Zr.

3. The metallic substrate of claim 1, wherein the at least one oxidic pigment is platelet-shaped.

4. The metallic substrate of claim 1, wherein the first coating sol comprises from 0.5% to 30% by weight of the at least one oxidic pigment.

5. The metallic substrate of claim 1, wherein the first coating sol comprises from 5% to 25% by weight of the at least one oxidic pigment.

6. The metallic substrate of claim 1, wherein the first coating sol comprises from 10% to 20% by weight of the at least one oxidic pigment.

7. The metallic substrate of claim 1, wherein thermal densification is carried out at a temperature of from 350° C. to 600° C., optionally preceded by a drying operation.

8. The metallic substrate of claim 7, wherein thermal densification is carried out at a temperature of from 450° C. to 500° C.

9. The metallic substrate of claim 1, wherein the protective layer is obtained according to alternative (i).

10. The metallic substrate of claim 1, wherein an alkali metal component of the second alkali metal silicate-containing coating sol is selected from the combinations Na/K, Na/Cs, and Na/Li.

11. The metallic substrate of claim 1, wherein the first alkali metal silicate-containing coating sol is obtainable by a process comprising hydrolysis and polycondensation of one or more silanes of general formula (I):

$$R_n SiX_{4-n} \quad \text{(I)}$$

in which the groups X are the same or different and represent a hydrolyzable group or a hydroxyl group, the groups R are the same or different and represent hydrogen, alkyl, alkenyl, and alkynyl groups having up to 4 carbon atoms, and aryl, aralkyl and alkaryl groups having 6 to 10 carbon atoms, and n is 0, 1 or 2, with the proviso that in at least one silane n=1 or 2, or oligomers derived therefrom, in the presence of
- a) at least one compound selected from oxides and hydroxides of alkali and alkaline earth metals, and
- b) optionally, nanoscale $SiO_2$ particles and/or
- c) optionally, alkoxides and/or soluble compounds of at least one of B, Al, Si, Ge, Sn, Y, Ce, Ti, and Zr.

12. The metallic substrate of claim 11, wherein an atomic ratio Si:alkali/alkaline earth metal is from 20:1 to 7:1.

13. The metallic substrate of claim 11, wherein an atomic ratio Si:alkali/alkaline earth metal is from 15:1 to 10:1.

14. The metallic substrate of claim 11, wherein an average value of n in the starting silanes of formula (I) is from 0.2 to 1.5.

15. The metallic substrate of claim 11, wherein an average value of n in the starting silanes of formula (I) is from 0.5 to 1.0.

16. A process for producing the metallic substrate of claim 1, wherein the process comprises applying a first alkali metal silicate-containing coating sol to the substrate or a surface thereof to form a first layer and either (i) thermally densifying the first layer, applying a second alkali metal silicate-containing coating sol to the densified first layer to form a second layer, and thermally densifying the second layer, or (ii) applying a second alkali metal silicate-containing coating sol to the first layer to form a second layer and thermally densifying the first layer and the second layer together, the first alkali metal silicate-containing coating sol comprising at least one oxidic pigment that comprises at least one element selected from Fe, Co, Ni, Cu, Zn, Nb, Ta, and elements from the third and fourth main and subgroups of the Periodic Table of Elements, and the second alkali metal silicate-containing coating sol differing from the first alkali metal silicate-containing coating sol in that it does not comprise the at least one oxidic pigment.

17. The process of claim 16, wherein thermal densification is carried out at a temperature of from 350° C. to 600° C., optionally preceded by a drying operation.

18. The process of claim 16, wherein a protective layer on the substrate is obtained according to alternative (i).

19. The process of claim 16, wherein thermal densification is performed in two stages, a first stage conducted in an oxygen containing atmosphere and a second stage conducted in a low-oxygen atmosphere until complete densification to form a vitreous layer.

* * * * *